United States Patent
Das et al.

(10) Patent No.: US 9,179,278 B2
(45) Date of Patent: Nov. 3, 2015

(54) SYSTEMS AND METHODS INVOLVING AUGMENTED MENU USING MOBILE DEVICE

(75) Inventors: Saumitra Mohan Das, San Jose, CA (US); Vinay Sridhara, Santa Clara, CA (US); Behrooz Khorashadi, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 13/284,103

(22) Filed: Oct. 28, 2011

(65) Prior Publication Data

US 2013/0061148 A1 Mar. 7, 2013

Related U.S. Application Data

(60) Provisional application No. 61/530,344, filed on Sep. 1, 2011.

(51) Int. Cl.
| | |
|---|---|
| *G06F 3/00* | (2006.01) |
| *H04W 4/18* | (2009.01) |
| *G06K 9/32* | (2006.01) |
| *G06F 17/30* | (2006.01) |
| *H04W 4/04* | (2009.01) |

(52) U.S. Cl.
CPC ......... *H04W 4/185* (2013.01); *G06F 17/30041* (2013.01); *G06F 17/30047* (2013.01); *G06K 9/3258* (2013.01); *H04W 4/04* (2013.01)

(58) Field of Classification Search
None
See application file for complete search history.

(56) References Cited

U.S. PATENT DOCUMENTS

| | | | |
|---|---|---|---|
| 7,765,231 B2 | 7/2010 | Rathus et al. | |
| 2002/0051575 A1 | 5/2002 | Myers et al. | |
| 2003/0009381 A1 | 1/2003 | Mattson | |
| 2005/0221856 A1 | 10/2005 | Hirano et al. | |
| 2006/0240862 A1* | 10/2006 | Neven et al. | 455/550.1 |
| 2008/0094496 A1* | 4/2008 | Wang et al. | 348/333.1 |
| 2008/0226130 A1* | 9/2008 | Kansal et al. | 382/106 |
| 2008/0253656 A1 | 10/2008 | Schwartzberg et al. | |
| 2008/0279481 A1* | 11/2008 | Ando | 382/306 |

(Continued)

FOREIGN PATENT DOCUMENTS

| | | |
|---|---|---|
| EP | 1662469 A1 | 5/2006 |
| JP | 2002032723 A | 1/2002 |

(Continued)

OTHER PUBLICATIONS

Hare J S et al., "Content-based image retrieval using a mobile device as a novel interface", Proc. of the SPIE, vol. 5682, Jan. 1, 2005, pp. 64-75, XP002448118. ISSN: 0277-786X, DOI: 10.1117/12.588979.

(Continued)

*Primary Examiner* — Matt Kim
*Assistant Examiner* — Hua Lu
(74) *Attorney, Agent, or Firm* — Kilpatrick Townsend Stockton LLP

(57) ABSTRACT

The subject matter disclosed herein relates to a method comprising displaying in a camera view of a mobile device a captured image of one or more items listed in a menu of items available for selection at a point of interest identifiable, at least in part, by a location. A method may further include transmitting a message comprising parsed text of the one or more items and information representative of the location, and receiving, in response to the transmission of the message, annotations to be displayed in the camera view.

32 Claims, 6 Drawing Sheets

(56) References Cited

U.S. PATENT DOCUMENTS

| | | | |
|---|---|---|---|
| 2009/0048820 A1 | 2/2009 | Buccella | |
| 2009/0055199 A1* | 2/2009 | Yusuf | 705/1 |
| 2009/0216446 A1* | 8/2009 | Ma et al. | 701/213 |
| 2009/0285492 A1* | 11/2009 | Ramanujapuram et al. | 382/209 |
| 2010/0146394 A1* | 6/2010 | Morris | 715/733 |
| 2010/0184451 A1* | 7/2010 | Wang et al. | 455/456.1 |
| 2010/0250126 A1* | 9/2010 | Epshtein et al. | 701/209 |
| 2010/0250136 A1* | 9/2010 | Chen | 701/300 |
| 2011/0072395 A1 | 3/2011 | King et al. | |
| 2011/0172989 A1* | 7/2011 | Moraes | 704/9 |
| 2011/0190008 A1* | 8/2011 | Eronen et al. | 455/456.3 |
| 2011/0246148 A1* | 10/2011 | Gupta et al. | 703/2 |
| 2012/0030578 A1* | 2/2012 | Athsani et al. | 715/738 |
| 2012/0093303 A1* | 4/2012 | Schultz | 379/159 |

FOREIGN PATENT DOCUMENTS

| | | |
|---|---|---|
| JP | 2003178067 A | 6/2003 |
| JP | 2006332830 A | 12/2006 |
| JP | 2007018166 A | 1/2007 |
| JP | 2009245276 A | 10/2009 |
| JP | 2010225123 A | 10/2010 |
| KR | 20100086427 A | 7/2010 |
| WO | WO-2005024774 A1 | 3/2005 |

OTHER PUBLICATIONS

Partial International Search Report—PCT/US2012/052693—ISA/EPO—Jan. 22, 2013.

Takacs G et al., "Outdoors augmented reality on mobile phone using loxel-based visual feature Organization", Proceedings of the workshop on Multimedia information retrieval (MIRO), XX, Vancouver, B.C., Canada, Oct. 27, 2008. pp. 427-434, XP007915264, DOI: 10.1145/1460096.1460165, ISBN: 978-1-60558-312-9.

Bruns, Erich et al., "Adaptive training of video sets for image recognition on mobile phones", Personal and Ubiquitous Computing, Mar. 5, 2008, pp. 165-178, vol. 13, No. 2, Springer Verlag, LO, XP019723912, ISSN: 1617-4917.

Gammeter S., et al., "Server-side Object Recognition and Client-side Object Tracking for Mobile Augmented Reality," 2010 IEEE Computer Society Conference on Computer Vision and Pattern Recognition Workshops, IEEE, Piscataway, NJ, USA, Jun. 13, 2010, pp. 1-8, XP031728435, ISBN: 978-1-4244-7029-7.

International Search Report and Written Opinion—PCT/US2012/052693—ISA/EPO—Mar. 18, 2013.

* cited by examiner

SYSTEMS AND METHODS INVOLVING AUGMENTED MENU USING MOBILE DEVICE

CROSS-REFERENCES TO RELATED APPLICATIONS

This application claims priority under 35 USC 119 to U.S. Provisional Patent Application No. 61/530,344, filed Sep. 1, 2011, and entitled "Systems and Methods Involving Augmented Menu Using Mobile Device," which is assigned to the assignee hereof and which is incorporated herein by reference.

BACKGROUND

1. Field

The subject matter disclosed herein relates to acquiring information regarding a target object using an image capturing device of a handheld mobile device.

2. Information

In a restaurant or other eating establishment, a patron may order items from a menu on printed media that lists items available for purchase, often with a written description of the item and its price. Other than a description of an item for purchase on a printed menu and/or descriptions that may be provided by waiting staff (who may be biased or inaccurate), a patron may also gain additional information regarding a menu item from restaurant reviews provided in a newspaper or blog, or by word of mouth, for example. However, a restaurant patron may have difficulty in obtaining object descriptions and/or critiques of items available for purchase in real-time (e.g., while at a restaurant).

In addition to identifying a location of a mobile device or physical business establishment with global coordinates (e.g., obtained from a position fix using a satellite positioning system), a location-based service may associate area or navigable regions with a location context identifier (LCI). In particular examples, an LCI may identify a floor or wing of an office building, store in a mall, or restaurant, just to name a few examples. In one particular application, an LCI may be used as a "handle" for obtaining information (e.g., in a request message to a remote server over a wireless communication link) pertaining to an associated area or region being defined by the LCI. Such information may include, for example, navigation maps and/or other navigation assistance data such as locations of access points for use in indoor positioning, just to name a few examples.

SUMMARY

In an implementation, a method may comprise displaying in a camera view of a mobile device a captured image of one or more items listed in a menu of items available for selection at a point of interest identifiable, at least in part, by a location. The method may further comprise transmitting a message comprising parsed text of the one or more items and information representative of the location, and receiving, in response to the transmission of the message, annotations to be displayed in the camera view. In another implementation, an apparatus may comprise means for displaying in a camera view of a mobile device a captured image of one or more items listed in a menu of items available for selection at a point of interest identifiable, at least in part, by a location, means for transmitting a message comprising parsed text of the one or more items and information representative of the location, and means for receiving, in response to the transmission of the message, annotations to be displayed in the camera view. In yet another implementation, an apparatus may comprise a processor to provide to a display device a camera view of a captured image of one or more items listed in a menu of items available for selection at a point of interest identifiable, at least in part, by a location, a transmitter to transmit a message comprising parsed text of the one or more items and information representative of the location, and a receiver to receive, in response to the transmission of the message, annotations to be displayed in the camera view. In still another implementation, a method performed at a camera of a mobile device may comprise capturing an image of a menu listing menu items available for selection at a point of interest, displaying the captured image of the menu on a display device of the mobile device, parsing text in the displayed image to identify at least one menu item of the displayed menu items, and associating a location of the mobile device and the parsed text with a previously captured image of the menu item as presented to a customer. In yet another implementation, an apparatus may comprise means for capturing an image of a menu listing menu items available for selection at a point of interest, means for displaying the captured image of the menu on a display device of the mobile device, means for parsing text in the displayed image to identify at least one menu item of the displayed menu items, and means for associating a location of the mobile device and the parsed text with a previously captured image of the menu item as presented to a customer. In still another implementation, an apparatus may comprise a display of a mobile device to display a captured image of a menu, a user interface to receive a selection of text displayed in the displayed image of the menu, and a processor to parse the text to identify at least one menu item of the displayed menu responsive to the selection of the text, wherein the processor is capable of associating a location of the mobile device and the parsed text with a previously captured image of the menu item as presented to a customer. In yet another implementation, an article comprising a non-transitory storage medium may comprise machine-readable instructions stored thereon that, in response to being executed by a special purpose computing device, are adapted to enable the special purpose computing device to process signals of an image from a camera including a listing of menu items available for selection at a location where the menu items are available for selection, process signals to display the captured image on a display device of a mobile device, parse text in the displayed image to identify at least one menu item of the displayed menu items, and associate the location and the parsed text with a previously captured image of the menu item as presented to a customer. It should be understood, however, that these are merely sample implementations provided for the purpose of illustration and that claimed subject matter is not limited in these respects.

BRIEF DESCRIPTION OF THE FIGURES

Non-limiting and non-exhaustive features will be described with reference to the following figures, wherein like reference numerals refer to like parts throughout the various figures.

DETAILED DESCRIPTION

Figure 1:
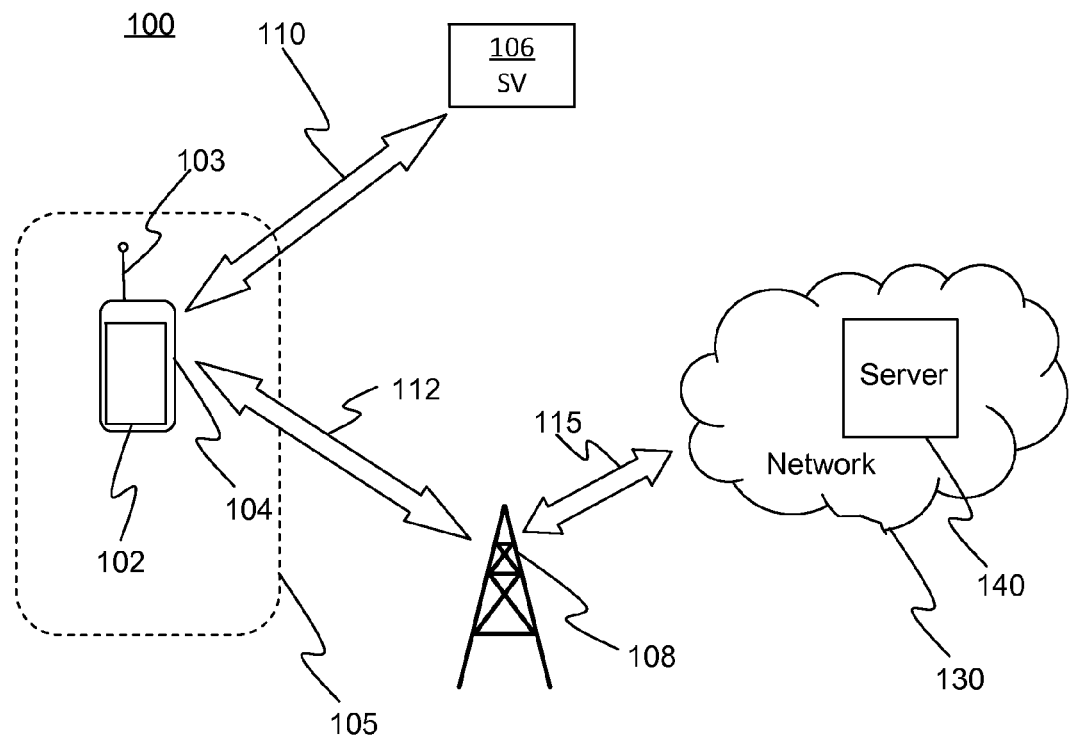
FIG. 1 is a schematic diagram showing an implementation of communication paths involving a mobile device.

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

Implementations described herein include using a mobile device (MD) to obtain information regarding items of a menu. A menu may comprise a list of items available for selection. For example, a menu may comprise a menu of a restaurant that includes a listing of menu items available for purchase, though claimed subject matter is not limited in this respect. Such information, which a user may obtain via a communication network in real-time, for example, may comprise images, reviews, or commentary about a menu item posted at an earlier time by other users. Using an MD, such as a Smartphone, for example, a user may capture an image of at least a portion of a menu that includes one or more menu items. A user may select a particular menu item for which to retrieve information stored in part (e.g., a database) of a communication network, for example.

In one particular example, an MD may comprise an augmented reality (AR) application enabling the MD to overlay information on an image of a camera view in a display of the MD. A camera view may comprise an image on a display device that includes a scene that is being captured by a camera in real-time, for example. Menu items shown in a camera view or image of a display may be overlaid with annotations such as, for example, images, pricing, reviews, ratings, and so on of menu items. Annotations may also include links to Internet sites that may include images, reviews, ratings, and so on. In one implementation, particular pricing may reflect special deals available for the day or time of day, prices for additional menu items not listed on the printed menu, discounts, and so on. In one particular example, attributes of a user of the MD (e.g., demographics, birthday, membership to special club, and so on) may be used to provide alternative or discriminatory pricing. In another example, menu items shown in a camera view of an MD that includes AR may be annotated with ratings to reflect popularity of the menu items. Such ratings may be determined from customer critiques received over time, for example.

In a particular implementation, a point of interest, such as a physical business establishment (e.g., a sit-down restaurant), may be identifiable, at least in part, by a location context identifier (LCI). As such, a restaurant patron located at the restaurant (identifiable by an LCI) may obtain information regarding menu items, for example, using an MD, which may communicate with a wireless network server. In one particular implementation, an MD may communicate with a wireless network server using an LCI as a handle, though claimed subject matter is not so limited.

In addition, an MD may include a camera and software capable of performing character recognition and/or parsing of words in text shown on a restaurant menu. Using text recognition for listed menu items and an LCI identifying the restaurant, an MD may transmit request messages to a remote server for information descriptive of the menu item, for example.

In another example implementation, selection of a menu item shown in a camera view may lead to overlaid annotations of the selected item. Such annotations may comprise a photograph, a written review or critique of a menu item, or an audio review or critique of the item, just to name a few of examples. Such annotations from previous customers, for example, may be stored on a server able to communicate with a wireless network. In one particular example, a photograph of a menu item overlaid in a camera view or display of an MD may have been taken by a previous customer and uploaded to a server. In one implementation, previous customers may have transmitted messages (e.g., photographs, reviews, and so on) to a remote server along with an identification of a menu item and an LCI uniquely identifying a restaurant or establishment, as discussed below.

In one particular implementation, a business establishment may provide coupons or discounts. For example, if a business establishment is having difficulty in receiving content (e.g., menu reviews or menu images) from current patrons for future presentation to subsequent patrons, the business establishment may provide an incentive to the current patrons by offering coupon or discount for providing content. Of course, coupons or discounts may be provided for any number of reasons, and claimed subject matter is not limited in this respect. In another implementation, a business establishment may provide membership in a frequent customer program. Based on a customer's profile or loyalty (e.g., frequency of visits, etc.), a customer may be offered a discount by the business establishment on some menu items. A loyal customer, for example, may be provided a new or modified price that is overlaid on top of an original price on a printed menu as seen in a camera view of an MD. In another example, an original price displayed in a camera view of an MD may be "scratched-out" by a customer (e.g., a user of the MD) to consequently reveal a discounted price.

In an implementation, a method for receiving information, such as reviews, critiques, or photos, just to name a few examples, regarding a menu item may comprise displaying in a camera view of an MD a captured image of one or more items listed in a menu. Such items may be available for purchase at a business establishment (e.g., a restaurant), which may be identifiable, at least in part, by a location. For example, a unique and/or identifiable feature of a restaurant may include its geographic location, which may be expressed as global coordinates (e.g., latitude/longitude), street address, city, county, and/or state, just to list a few examples. In one implementation, a location of a business establishment may be represented by an LCI. A message comprising words or symbols parsed from text of one or more menu items and information representative of a location of a restaurant may be wirelessly transmitted to a network, such as the Internet, for example. In response to such a transmission, annotations comprising reviews, critiques, or photos of a menu item, just to name a few examples, may be displayed in a camera view of an MD. In other examples, annotations may comprise purchase price or ratings (e.g., popularity, flavor, appeal, healthiness, and so on) of a menu item. Annotations may be superimposed on at least a portion of a captured image of one or more menu items displayed in a camera view of an MD, for example.

In an implementation, an apparatus for performing a method for receiving information, such as reviews, critiques, or photos may comprise an MD that includes a camera and a display to capture and display an image of one or more menu items available for purchase at a business establishment, which may be characterized and/or identified by its location. An apparatus may further comprise a transmitter to transmit signals to a wireless network and a receiver to receive signals from the wireless network. For example, transmitted signals may be representative of a message comprising words or symbols parsed from text of one or more menu items and/or information representative of a location of the business establishment hosting or serving the menu items. Received messages may be representative of annotations, which may comprise reviews, critiques, or photos of one or more menu items, which may be subsequently displayed in a camera view of an MD.

In another implementation, a method for receiving information, such as reviews, critiques, or photos, just to name a few examples, regarding a menu item may comprise capturing an image of at least a portion of a menu listing one or more menu items available for purchase at a business establishment. Such an image may be captured by an image capturing device of an MD, for example, and the captured image may be displayed in a camera view of the MD. The displayed menu may comprise text that may be parsed in a process to identify at least one of the displayed menu items. Though claimed subject matter is not so limited, words or symbols may be parsed from text in response to a selection of the text by a user at a user interface of an MD. In one implementation, a processor of an MD may associate a location of the MD and/or parsed text with a previously captured image of a menu item previously presented to a customer. In another implementation, a processor at a remote server may associate a location of an MD and/or parsed text with a previously captured image of a menu item previously presented to a customer. For example, a customer some time earlier (e.g., minutes, days, weeks, months, or years) may have received a menu item included in a captured image of the menu, captured an image of the menu item, and posted the image of the menu item (possibly accompanied with a review or critique, for example) onto a wireless network, which may have stored the image.

In a particular implementation, an MD used to receive information about a menu item may be located at a business establishment that is identifiable, at least in part, by a LCI. A process of associating a location of an MD and parsed text with previously captured image may comprise transmitting parsed text and a LCI to a wireless network, such as a remote server, for example. A previously captured image may be received in response to transmitting parsed text and an LCI. In another particular implementation, audio content provided by a previous purchaser of a menu item may be received in response to transmitting parsed text and an LCI.

In an implementation, an apparatus for performing a method for receiving information, such as reviews, critiques, or photos may comprise a camera of an MD to capture an image of at least a portion of a menu listing one or more items. An MD may include a view finder or display device to display an image of at least a portion of a menu. An MD may further comprise a user interface, which may comprise a touch screen overlaid onto a camera view, for example, to receive a selection of text of a menu displayed in the displayed image. An MD may include one or more applications to be executed by a processor to parse selected text and to identify at least one menu item in response to a selection of the text. Such a processor may be capable of associating a location of an MD with a previously captured image of a menu item as presented to a previous customer, as mentioned above, for example. An apparatus may further comprise a transmitter to transmit parsed text and an LCI of a business establishment to a remote server, and a receiver to receive a previously captured image in response to transmitting parsed text and an LCI, for example.

In another implementation, a method for receiving information, such as reviews, critiques, or photos, just to name a few examples, regarding a menu item may comprise receiving a captured image of a served restaurant menu item presented to a customer and tagging the received image with an LCI based, at least in part, on a location of an MD. For example, a location may comprise that of a business establishment identifiable, at least in part, by the LCI. A tagged image may be transmitted to a server to be accessible, at least in part, using an LCI and/or an identification of a menu item. A captured image may be annotated with textual and/or audio content received at a user interface of an MD. In a particular implementation, a camera view of an MD may indicate a coupon incentive for uploading an image and/or critique of at least one item listed on a menu, as explained below.

FIG. 1 is a schematic diagram showing a system 100 of communication paths involving an MD 104. An MD may include an image capturing device (not shown) to capture an image such as a restaurant menu or a portion thereof. MD 104 may also include a display 102, a keypad or other device (not shown) to receive information from a user, and/or an antenna 103. Such an image capturing device (e.g., a camera) may display a viewfinder image and/or a captured image in display 102. MD 104 may include a special purpose processor (e.g., as shown in the particular implementation of FIG. 8) to host one or more applications, as described in greater detail below. MD 104 may include one or more user interfaces such as a keypad and/or a display 102, which may comprise a touch screen for example. Antenna 103 may comprise a portion of a transmitter/receiver used by MD 104 to transmit and/or receive various signals, such as from a satellite vehicle (SV) 106, and/or to/from a base station 108, as described below, for example. In a particular example application, MD 104 may be directed or aimed so that a captured image comprises at least a portion of a menu, such as that shown below in FIGS. 2-4, for example. Of course, such details of an MD are merely examples, and claimed subject matter is not so limited.

An MD may be located at a business establishment 105, such as a restaurant, for example. A location of a business establishment and/or MD 104 may be determined by any of a number of techniques. For example, a location of MD 104 may be provided to the MD by a user and/or determined using any one of several available positioning techniques. A list of such positioning techniques may include satellite positioning system (SPS), a Personal Area Network (PAN), a Local Area Network (LAN), a Wide Area Network (WAN), Ultra-wideband (UWB), AFLT, digital TV, a wireless repeater, RFID, a radio-location beacon, cell tower ID, and/or Bluetooth, just to name a few examples. Some positioning techniques may provide less precise position information compared to other positioning techniques. Less precise position information, for example, may pinpoint a location of MD 104 only to within a relatively large area, such as a building, a city block, a state, and so on. Even so, as explained below, MD 104 may transmit restaurant menu information to a wireless network that may use such information to uniquely determine a relatively precise location of the MD located at the restaurant. Of course, such details of acquiring position information are merely examples, and claimed subject matter is not so limited.

MD 104 may comprise any one of a variety of mobile receivers capable of receiving satellite navigation signals 110 and capable of transmitting/receiving wireless communication signals 112 to/from a base station 108. Signals 110, for example, may be transmitted from reference stations such as SVs 106 and/or from terrestrial locations such as land-based beacons or base stations 108. MD 104 may comprise a mobile phone, a Smartphone, a handheld navigation receiver, and/or a personal digital assistant (PDA), just to name a few examples. As mentioned above, MD 104 may employ any of several techniques to compute its position. In a particular implementation, such a positioning technique may be based, at least in part, on wireless signals 110 and/or wireless signals 112 received from satellites 106 and/or land-based base stations 108, respectively. In some implementations, MD 104 may integrate both an SPS receiver and a wireless communication device for voice and/or data communication. Thus, although the specific example of an SPS system may be described herein, such principles and techniques may be applicable to other satellite positioning systems or terrestrial positioning systems such as a wireless network.

System 100 may further comprise a network 130, such as a remote and/or wireless network. Network 130 may comprise the Internet, WAN or LAN, for example. Network 130 may include a server 140, which may comprise a computing system and memory, for example. MD 104 may communicate with server 140 via signals 112 and 115 to/from land-based beacons or base stations 108, for example. Of course, such details of system 100 are merely examples, and claimed subject matter is not so limited.

Figure 2:
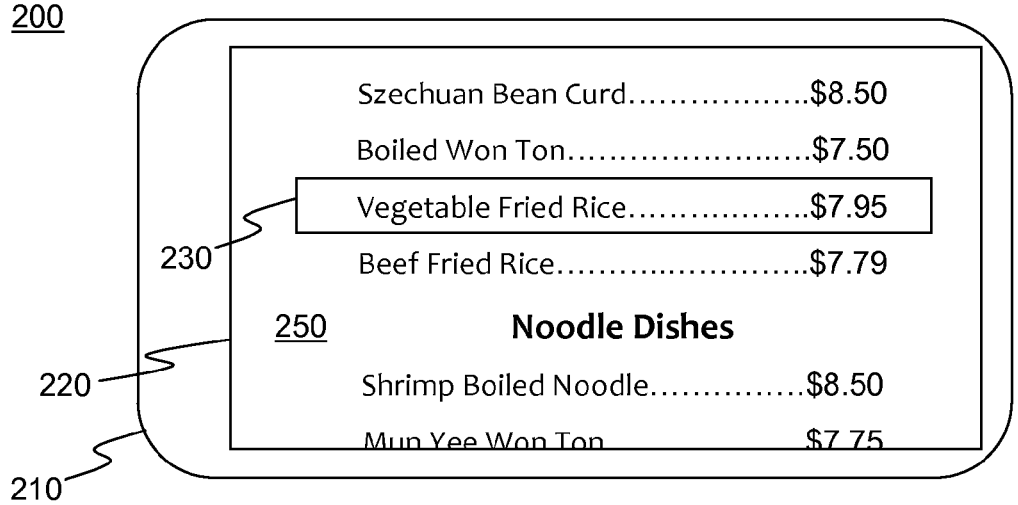
FIG. 2 shows a portion of a menu including a selected menu item, according to an implementation.

FIG. 2 shows a portion of a menu 250 including a selected menu item 230, according to an implementation 200. Menu 250 may comprise an image captured by MD 210 and displayed in screen 220 (e.g., a display or viewfinder of MD 210). Menu 250 may comprise a portion of a menu. For example, displayed portion of menu 250 shows about six menu items, whereas many more items may be included in a full menu. A user may select one or more menu items included in the displayed portion of menu 250. For example, if screen 220 comprises a touch screen, then a user may select menu item 230 by touching at least a portion of screen 220 displaying the menu item 230. Using another technique, a user may select menu item 230 by adjusting a cursor or other pointing device, for example, to the menu item 230. Of course, claimed subject matter is not limited in this respect.

Figure 3:
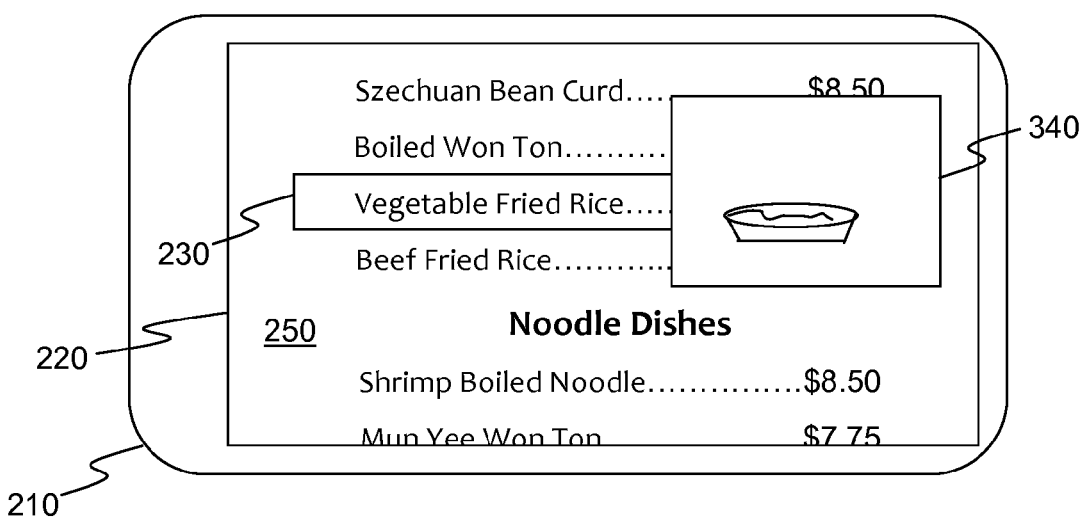
FIG. 3 shows a portion of a menu including an image of a selected menu item, according to an implementation.

FIG. 3 shows a portion of menu 250 including an image 340 of selected menu item 230, according to implementation 300. Image 340 may comprise an annotation superimposed on a portion of screen 220. Image 340 may comprise an image wirelessly received from a remote network storing the image captured by a user in the past. MD 210 may receive signals representing image 340 via land-based beacons or base stations 108, as shown in FIG. 1, for example. MD 210 may receive such signals in response to MD 210 transmitting information regarding selected menu item 230, as explained below, for example. Annotations may include content other than image 340, such as textual and/or audio content, for example.

Figure 4:
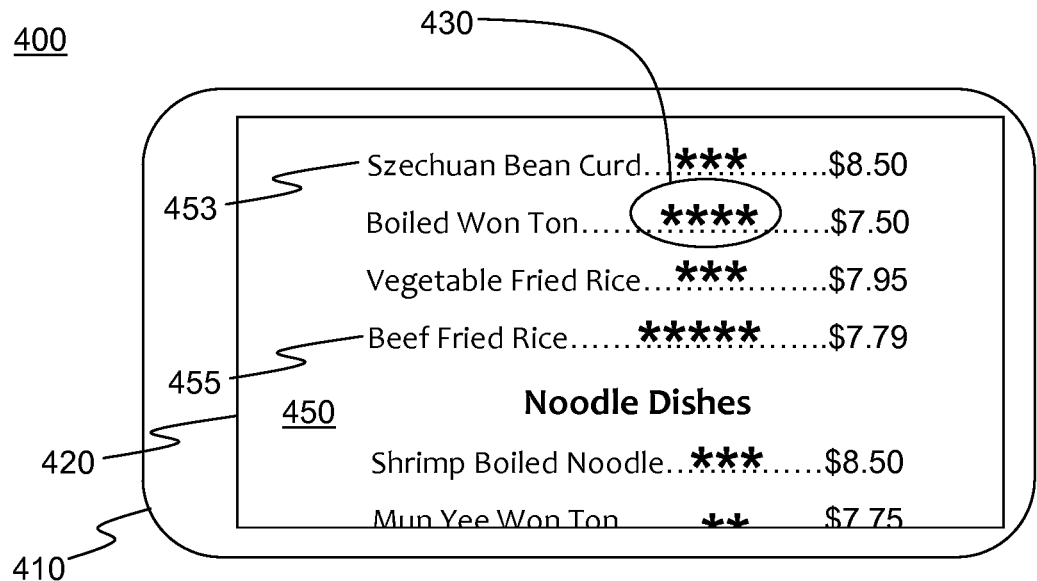
FIG. 4 shows a portion of a menu including ratings for menu items, according to an implementation.

FIG. 4 shows a portion of a menu 450 including ratings 430 for menu items, according to implementation 400. Menu 450 may comprise an image captured by MD 410 and displayed in screen 420 (e.g., a display or viewfinder of MD 410). Menu 450 may comprise a portion of a menu. For example, displayed portion of menu 450 shows about six menu items, whereas many more items may be included in a full menu. Screen 420 may display ratings 430 superimposed on a portion of displayed menu 450. Ratings 430 may comprise an icon or symbol to represent ratings of individual menu items. For example, menu item 455 is associated with a rating of five "stars," whereas menu item 453 is associated with a rating of three "stars." Accordingly, in this example, menu item 455 has received more favorable reviews over time than that of menu item 453. Ratings 430 may be wirelessly received from a remote network storing ratings information formed by a number of users posting menu item reviews over time, for example. MD 410 may receive signals representing ratings 430 via land-based beacons or base stations 108, as shown in FIG. 1, for example. MD 410 may receive such signals in response to MD 410 transmitting information regarding menu 450 and/or a location of a restaurant hosting the menu, as explained below, for example.

Figure 5:
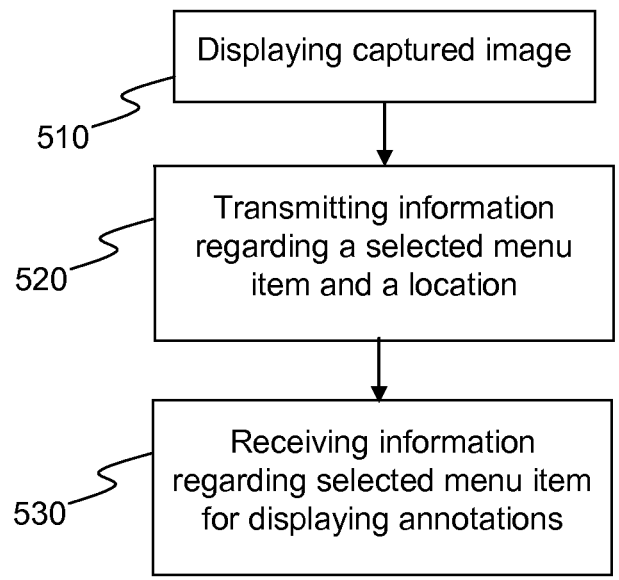
FIG. 5 is a flow diagram illustrating a process for displaying annotations of a menu item, according to an implementation.

FIG. 5 is a flow diagram illustrating a process 500 for displaying annotations of a menu item, according to an implementation. For example, such annotations may comprise reviews, critiques, or photos, just to name a few examples, regarding a menu item. At block 510, a captured image of one or more items listed in a menu may be displayed in a camera view of an MD. Such items may be available for purchase at a point of interest, such as a restaurant, for example, which may be identifiable, at least in part, by a location. For example, a unique and/or identifiable feature of a restaurant may include its geographic location, which may be expressed as global coordinates (e.g., latitude/longitude), street address, city, county, and/or state, just to list a few examples. In one implementation, a location of a business establishment may be represented by an LCI. At block 520, a message comprising words or symbols parsed from text of one or more menu items and information representative of a location of a restaurant may be wirelessly transmitted to a network, such as the Internet, for example. At block 530, in response to such a transmission, information representative of annotations may be received. Of course, such details of process 500 are merely examples, and claimed subject matter is not so limited.

Figure 6:
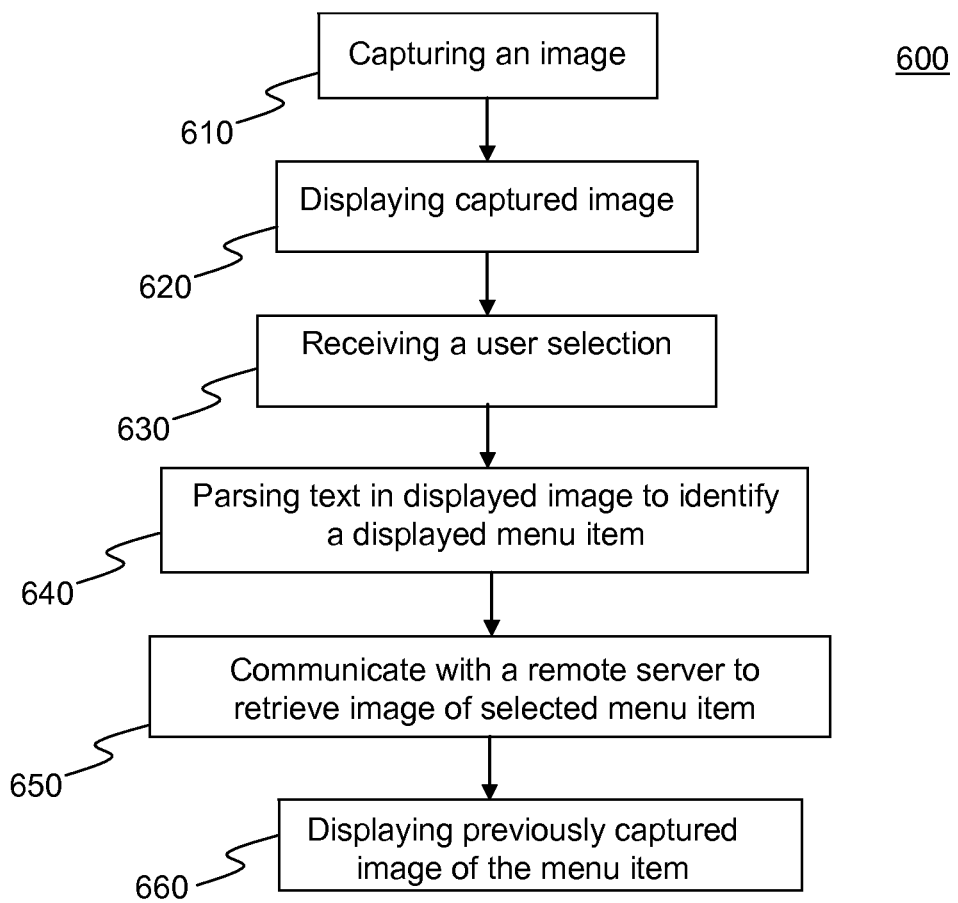
FIG. 6 is a flow diagram illustrating a process for displaying an image of a menu item, according to an implementation.

FIG. 6 is a flow diagram illustrating a process 600 for displaying an image of a menu item, according to a particular implementation. Process 600 may be performed by an MD located at a restaurant, for example. In an example, a restaurant may provide a menu listing a number of menu items without images of the menu items. A user dining at the restaurant may operate an MD to perform process 600 to retrieve an image of a selected menu item. In other implementations, annotations, such as a written review or critique of a menu item, or an audio review or critique of the item, just to name a few of examples, may similarly be retrieved, and claimed subject matter is not limited in this respect.

At block 610, a user may operate an MD to capture an image of at least a portion of a menu that includes the user's item of interest. A display of the MD may comprise a camera view display allowing the user to selectively aim the MD to capture a desired portion of a menu, for example. At block 620, the MD may display the captured image. For example, returning to FIG. 2, menu portion 250 may be displayed in screen 220. At block 630, the MD may receive signals representative of the user's menu item selection, which may be selected from among a plurality of menu items in the displayed captured image. Of course, a selected menu item may comprise a single displayed menu item, and claimed subject matter is not limited in this respect. As described above, a user may select a particular menu item by touching a portion of the displayed menu item, if the MD comprises a touch screen. Otherwise, cursors or other pointing and/or selecting devices may be used to select a particular menu item. In other implementations, more than one menu item may be selected, and claimed subject matter is not limited in this respect.

At block 640, a user's selected menu item comprising text may be parsed in a process of analyzing the text to identify the menu item. For example, such a process may involve character and/or text recognition.

At block 650, the MD may communicate with a remote server, such as server 140 shown in FIG. 1, for example, to attempt to retrieve an image of the selected menu item. For example, an MD may transmit parsed text and an LCI to a wireless network. The MD may receive a previously captured image (or a review or a critique, for example) from the network in response to transmitting parsed text and an LCI. At block 660, the image received from the network may be displayed at least partially over, adjacent to, or near the text of the selected menu item. Of course, such details of process 600 are merely examples, and claimed subject matter is not so limited.

Figure 7:
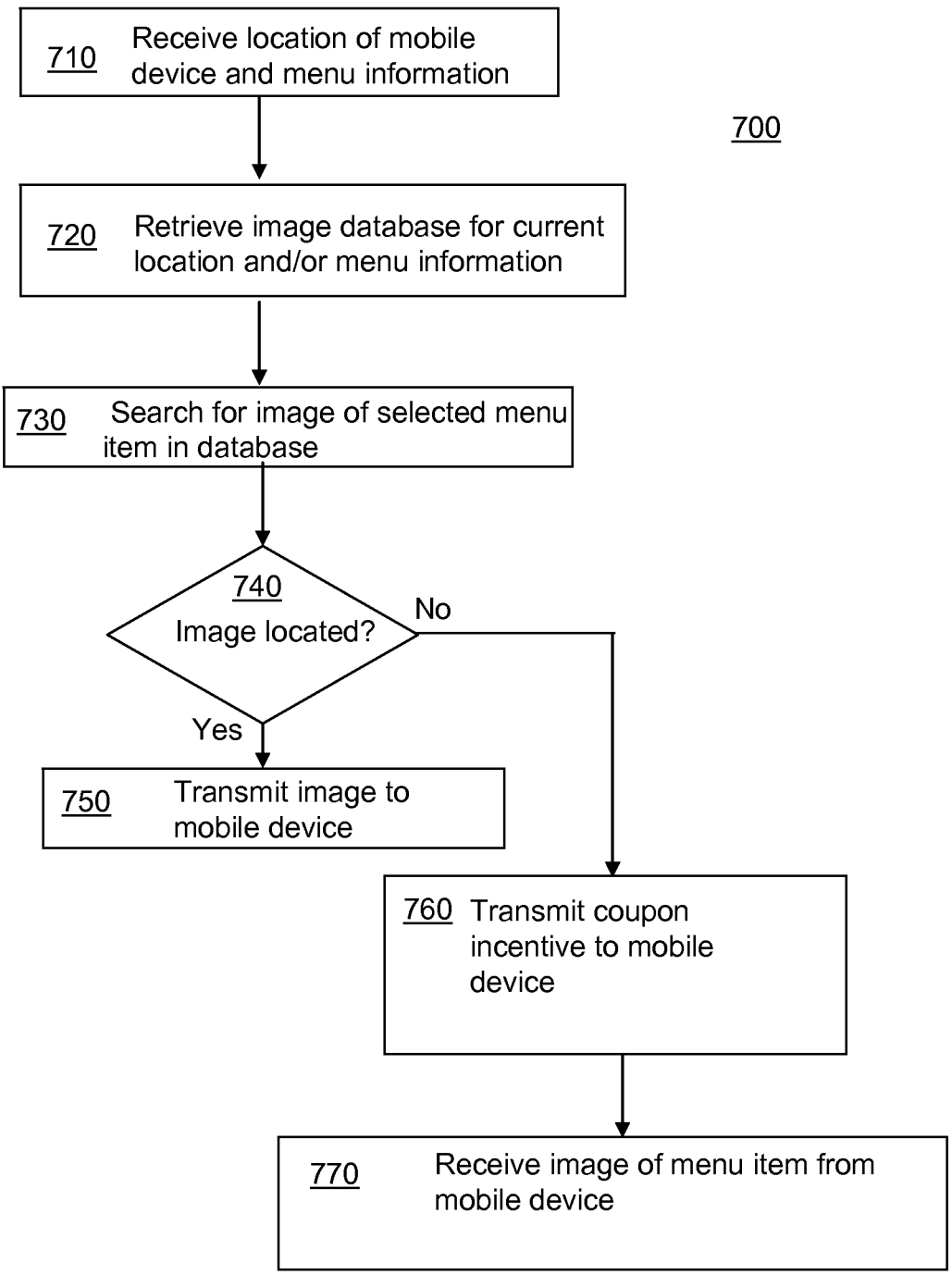
FIG. 7 is a flow diagram illustrating a process for collecting information about menu items, according to an implementation.

FIG. 7 is a flow diagram illustrating a process 700 for collecting information about menu items or providing images of selected menu items, according to an implementation. Process 700 may be performed by a server, such as server 140 shown in FIG. 1, for example. As explained above, a server may wirelessly communicate with an MD, which may provide information regarding the MD's location and/or menu information (e.g., parsed menu text or menu images, just to name a few examples). At block 710, for example, a server may receive location information of an MD, and in doing so may also receive the location and/or identification of the restaurant where the MD is located. In one implementation, an MD may use an LCI as a handle to communicate with a server. In such a case, the LCI may be used to determine the location and/or identification of the restaurant where the MD is located. In another implementation, an MD may determine its position using SPS and transmit this position information to a server. In addition to receiving location information of an MD, a server may also receive menu information, as mentioned above.

At block 720, a processor at a server, for example, may use restaurant location information and/or menu information to prepare for an image search by retrieving stored information from memory (e.g., databases). For example, knowledge of a particular restaurant location may limit an image search by reducing a number of candidate images to only those associated with that particular location (e.g., a particular location identifiable, at least in part, by an LCI). In one implementation, stored images may include information (e.g., metadata) regarding the stored images. For example, a stored image may include information regarding a corresponding menu item, restaurant, date and/or time that image was captured, whether there exists corresponding reviews, ratings, memory locations of possible reviews or ratings, just to name a few examples.

At block 730, a search for an image of a selected menu item may be performed. At diamond 740, a determination may be made regarding whether an image corresponding to a selected menu item is located. If so, then process 700 may proceed to block 750 where the located image may be transmitted to the MD for display to a user. On the other hand, if an image is not located, then process 700 may proceed to block 760 where an incentive program may be performed. For example, in one particular implementation, if a business establishment is having difficulty in receiving content from current patrons for future presentation to subsequent patrons, an incentive may be provided to the current patrons by, for example, offering coupon or discount for providing content. Accordingly, at block 760, a coupon or other incentive (e.g., reward points) may be transmitted to an MD. At block 770, a user may respond to such an incentive by transmitting an image of a menu item via an MD to be received by the server, for example. Of course, such details of process 700 are merely examples, and claimed subject matter is not so limited.

Figure 8:
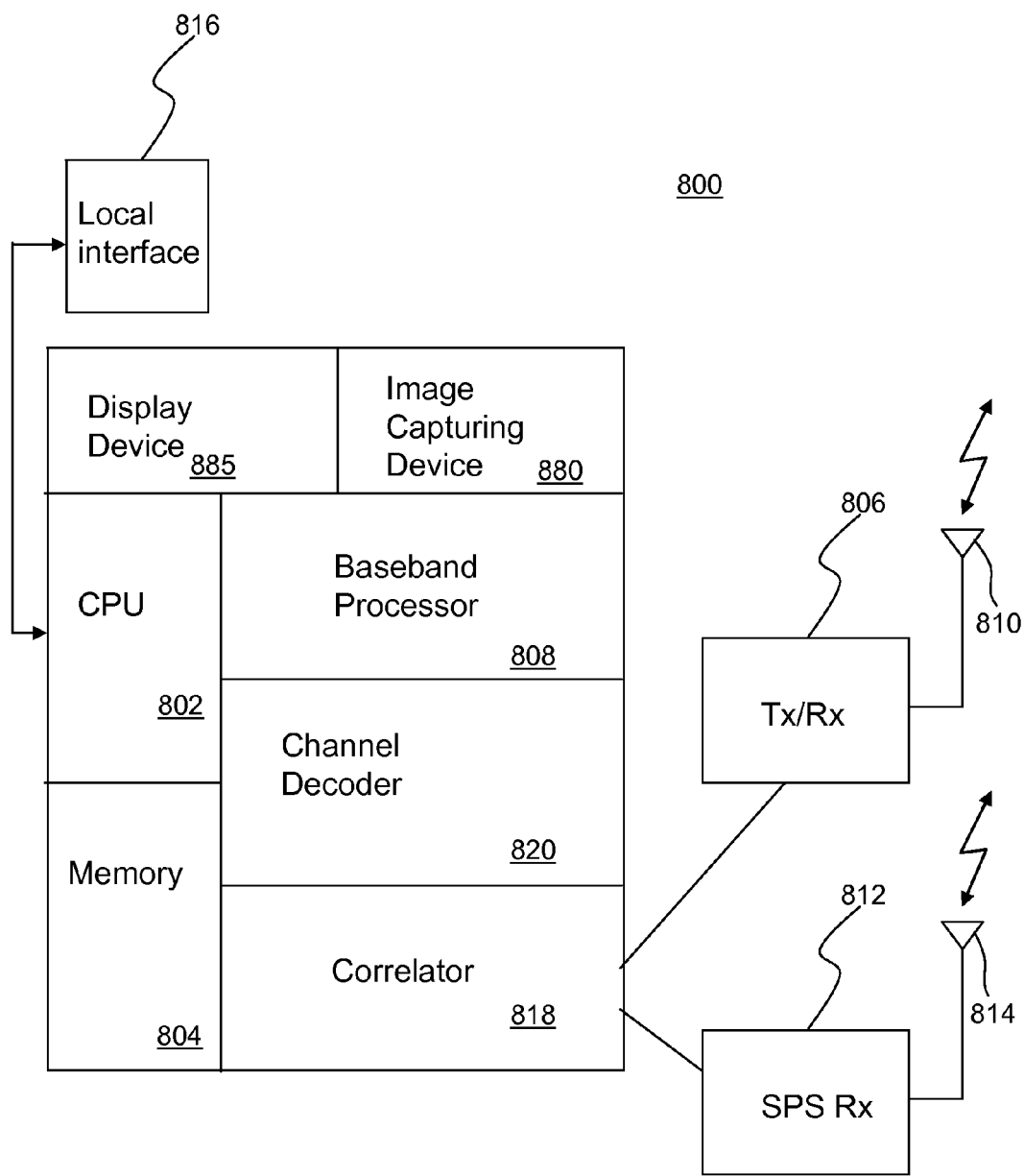
FIG. 8 is a schematic diagram of a mobile device capable of capturing and displaying images and communicating with a wireless network, according to an implementation.

FIG. 8 is a schematic diagram of a device capable of communication with a wireless network, according to one implementation. Such a device may include an image capturing device. In a particular implementation, an MD, such as MD 104 shown in FIG. 1, may comprise a device 800 that is capable of processing SPS signals received at an antenna 814 for determining pseudorange measurements and communicating with a wireless communication network through antenna 810. Here, a radio transceiver 806 may be adapted to modulate an RF carrier signal with baseband information, such as data, voice, and/or SMS messages, onto an RF carrier, and demodulate a modulated RF carrier to obtain such baseband information. Antenna 810 may be adapted to transmit a modulated RF carrier over a wireless communications link and receive a modulated RF carrier over a wireless communications link.

Baseband processor 808 may be adapted to provide baseband information from central processing unit (CPU) 802 to transceiver 806 for transmission over a wireless communications link. Channel decoder 820 may be adapted to decode channel symbols received from baseband processor 808 into underlying source bits.

SPS receiver (SPS Rx) 812 may be adapted to receive and process transmissions from SVs, and provide processed information to correlator 818. Correlator 818 may be adapted to derive correlation functions from the information provided by receiver 812. Correlator 818 may also be adapted to derive pilot-related correlation functions from information relating to pilot signals provided by transceiver 806. This information may be used by a device such as MD 104 to acquire information in a wireless communications network.

Memory 804 may be adapted to store machine-readable instructions which are executable to perform one or more processes, implementations, or examples thereof which have been described or suggested. CPU 802, which may comprise a special purpose processor, may be adapted to access and execute such machine-readable instructions. However, these are merely examples of tasks that may be performed by a CPU in a particular aspect and claimed subject matter in not limited in these respects. Further, memory 804 may be adapted to store one or more predetermined candidate trajectories, wherein CPU 802 may be adapted to determine a location of device 800 based, at least in part, on a comparison of an estimated trajectory with the one or more predetermined candidate trajectories. In a particular implementation, CPU 802 may be adapted to reduce a number of the one or more predetermined candidate trajectories based at least in part on ES position information.

In one implementation, machine-readable instructions stored in a storage medium, in response to being executed by a special purpose computing device (e.g., CPU 802), may be adapted to enable the special purpose computing device to process signals from image capturing device 880 capturing an image of a menu listing menu items available for purchase at a business establishment, process signals to display the captured image of the menu on display device 885, parse text displayed in the displayed image to identify at least one menu item of the displayed menu items responsive to a selection of the text at local interface 816, and associate a location of the MD and the parsed text with a previously captured image of the menu item as presented to a customer. In another implementation, an MD may comprise a receiver 812 to receive RF signals and a transmitter 806 to transmit RF signals, an image capturing device 880 to capture an image of a served restaurant menu item presented to a customer, and CPU 802 to operate in an RF environment to tag the image with an LCI based, at least in part, on a location of the MD.

In an implementation, image capturing device 880 may comprise a camera including a charge coupled device (CCD) array and/or a CMOS array of light sensors, focusing optics, a viewfinder, and/or interfacing electronics to communicate with CPU 802 and memory 804, for example. Display device 885 may comprise a liquid crystal display (LCD) that, in some implementations, may be touch sensitive to provide means for user interaction. Display device 885 may operate as a viewfinder for image capturing device 880, though claimed subject matter is not so limited. Images may be stored in memory 804 so that stored images may be retrieved as a selected target object, as described above.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

An entity such as a wireless terminal may communicate with a network to request data and other resources. An MD, including a cellular telephone, a Smartphone, a personal digital assistant (PDA), or a wireless computer are just a few examples of such an entity. Communication of such an entity may include accessing network data, which may tax resources of a communication network, circuitry, or other system hardware. In wireless communication networks, data may be requested and exchanged among entities operating in the network. For example, an MD may request data from a wireless communication network to determine the position of the MD operating within the network: data received from the network may be beneficial or otherwise desired for such a position determination. However, these are merely examples of data exchange between an MD and a network in a particular aspect, and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   displaying in a camera view of a mobile device a captured image of one or more items available for selection at a point of interest, wherein the point of interest is identifiable, at least in part, by a location determined based, at least in part, on information associated with a location context identifier, wherein the location context identifier pertains to information to identify an area of a building;
   transmitting, by the mobile device to a server, a message comprising the location context identifier and parsed text of a particular item selected from among the one or more items based upon a user-input detected by the mobile device, wherein the transmitted location context identifier is separate from the captured image and is usable to search for information related to the particular item; and
   receiving, in response to said transmission of said message, one or more annotations that include information about the particular item to be displayed in said camera view, wherein said one or more annotations are superimposed in a portion of said camera view including said captured image of said particular item.

2. The method of claim 1, wherein said one or more annotations comprise purchase prices of said particular item.

3. The method of claim 1, wherein said one or more annotations comprise ratings of said particular item.

4. The method of claim 1, wherein said one or more annotations comprise one or more images of said particular item.

5. The method of claim 1, wherein said one or more annotations are superimposed in a portion of said camera view including said captured image of said particular item.

6. The method of claim 1, wherein said point of interest comprises a restaurant.

7. An apparatus comprising:
   means for displaying in a camera view of a mobile device a captured image of one or more items available for selection at a point of interest, wherein the point of interest is identifiable, at least in part, by a location determined based, at least in part, on information associated with a location context identifier, wherein the location context identifier pertains to information to identify an area of a building;
   means for transmitting, from the mobile device to a server, a message comprising the location context identifier and parsed text of a particular item selected from among the one or more items based upon a user-input detected by the mobile device, wherein the transmitted location context identifier is separate from the captured image and is usable to search for information related to the particular item; and
   means for receiving, in response to said transmission of said message, one or more annotations that include information about the particular item for display in said camera view, wherein said one or more annotations are superimposed in a portion of said camera view including said captured image of said particular item.

8. The apparatus of claim 7, wherein said one or more annotations comprise purchase prices of said particular item.

9. The apparatus of claim 7, wherein said one or more annotations comprise ratings of said particular item.

10. The apparatus of claim 7, wherein said point of interest comprises a restaurant.

11. An apparatus comprising:
a processor configured to provide to a display device a camera view of a captured image of one or more items available for selection at a point of interest, wherein the point of interest is identifiable, at least in part, by a location determined based, at least in part, on information associated with a location context identifier, wherein the location context identifier pertains to information to identify an area of a building;
a transmitter configured to transmit to a server a message comprising the location context identifier and parsed text of a particular item selected from among the one or more items based upon a user-input detected by the apparatus, wherein the transmitted location context identifier is separate from the captured image and is usable to search for information related to the particular item; and
a receiver configured to receive, in response to said transmission of said message, one or more annotations that include information about the particular item to be displayed in said camera view, wherein said one or more annotations are superimposed in a portion of said camera view including said captured image of said particular item.

12. The apparatus of claim 11, wherein said one or more annotations comprise purchase prices of said particular item.

13. The apparatus of claim 11, wherein said one or more annotations comprise ratings of said particular item.

14. The apparatus of claim 11, wherein said annotations comprise one or more images of said particular item.

15. The apparatus of claim 11, wherein said point of interest comprises a restaurant.

16. A method comprising:
at a camera of a mobile device, capturing an image of a menu listing menu items available for selection at a point of interest that is identifiable by a location context identifier;
displaying the captured image of said menu in a camera view of said mobile device;
parsing, by the mobile device, particular text in the displayed image to identify a particular menu item selected from among said displayed menu items based upon a user-input detected by the mobile device;
associating a location of said mobile device and said particular parsed text with a previously captured image of said particular menu item as presented to a customer, wherein associating said location and said particular parsed text with said previously captured image includes transmitting said location context identifier and said particular parsed text to a remote server; and
receiving from the remote server one or more annotations that include information about said particular menu item for display in said camera view, wherein said one or more annotations are superimposed in a portion of said camera view including said captured image of said particular menu item.

17. The method of claim 16, wherein said associating said location of said mobile device and said particular parsed text with said previously captured image further comprises:
receiving said previously captured image in response to said transmitting said particular parsed text and said location context identifier.

18. The method of claim 17, further comprising:
receiving audio content provided by a previous purchaser of said particular menu item in response to said transmitting said particular parsed text and said location context identifier.

19. The method of claim 16, wherein said point of interest comprises a restaurant.

20. The method of claim 16, further comprising:
displaying a modified price of said particular menu item on a display device of said mobile device.

21. The method of claim 20, wherein said modified price is overlaid on an original price on said image of said menu.

22. The method of claim 20, wherein said modified price is based, at least in part, on a profile and/or loyalty of said customer.

23. An apparatus comprising:
at a camera of a mobile device, means for capturing an image of a menu listing menu items available for selection at a point of interest that is identifiable by a location context identifier;
means for displaying the captured image of said menu in a camera view of said mobile device;
means for parsing particular text in the displayed image to identify a particular menu item selected from among said displayed menu items based upon a user-input detected by the mobile device;
means for associating a location of said mobile device and said particular parsed text with a previously captured image of said particular menu item as presented to a customer, wherein associating said location and said particular parsed text with said previously captured image includes transmitting said location context identifier and said particular parsed text to a remote server; and
means for receiving from said remote server at least one annotation that includes information about the particular menu item, wherein said at least one annotation is superimposed in a portion of said camera view including said captured image of said particular menu item.

24. The apparatus of claim 23, wherein said means for associating said location of said mobile device and said particular parsed text with said previously captured image further comprises:
means for transmitting said particular parsed text and said location context identifier to the remote server; and
means for receiving said previously captured image in response to transmitting said particular parsed text and said location context identifier.

25. The apparatus of claim 24, further comprising:
means for receiving audio content provided by a previous purchaser of said particular menu item in response to transmitting said parsed text and said location context identifier.

26. The apparatus of claim 23, wherein said point of interest comprises a restaurant.

27. An apparatus comprising:
a display of a mobile device configured to display a captured image of a menu;
a user interface configured to receive a user-selection of particular text from among a plurality of distinct text displayed in the displayed image of said menu; and
a processor configured to parse said particular text to identify a particular menu item of a plurality of items of said menu responsive to said selection of said particular text, wherein said processor is capable of associating a location of said mobile device, wherein the location is identifiable by a location context identifier, and said particular parsed text with a previously captured image of said particular menu item, wherein associating said location and said particular parsed text with said previously captured image includes transmitting said location context identifier and said particular parsed text to a remote server, and wherein at least one annotation that includes information about the particular menu item is received from said remote server and is superimposed in a portion of a camera view of said mobile device including said captured image of said particular menu item.

28. The apparatus of claim 27, further comprising:
a transmitter to transmit said particular parsed text and the location context identifier of a business establishment to the remote server; and
a receiver to receive said previously captured image in response to transmitting said particular parsed text and said location context identifier.

29. The apparatus of claim 28, wherein said receiver is capable of receiving audio content provided by a previous purchaser of said particular menu item in response to said transmitting said particular parsed text and said location context identifier.

30. An article comprising: a non-transitory storage medium comprising machine-readable instructions stored thereon that are executable by a special purpose computing device configured to:
process signals of an image from a camera including a listing of menu items available for selection at a location where said menu items are available for selection, wherein the location is at a business establishment identifiable by a location context identifier;
process signals to display the captured image in a camera view of a mobile device;
parse particular text in the displayed image to identify a particular menu item selected from among said displayed menu items based upon a user-input detected by the mobile device; and
associate said location and said particular parsed text with a previously captured image of said particular menu item as presented to a customer, wherein associating said location and said particular parsed text with said previously captured image includes transmitting said location context identifier and said particular parsed text to a remote server, and wherein at least one annotation that includes information about the particular menu item is received from said remote server and is superimposed in a portion of said camera view including said captured image of said particular menu item.

31. The article of claim 30, wherein said non-transitory storage medium comprising said machine-readable instructions stored thereon that are executable by said special purpose computing device further configured to:
transmit said particular parsed text and said location context identifier to the remote server; and
receive said previously captured image in response to transmitting said particular parsed text and said location context identifier.

32. An article comprising: a non-transitory storage medium comprising machine-readable instructions stored thereon that are executable by a special purpose computing device configured to:
display in a camera view of a mobile device a captured image of one or more items available for selection at a point of interest, wherein the point of interest is identifiable, at least in part, by a location determined based, at least in part, on information associated with a location context identifier, wherein the location context identifier pertains to information to identify an area of a building;
transmit to a server a message comprising the location context identifier and parsed text of a particular item selected from among the one or more items based upon a user-input detected by the mobile device, wherein the transmitted location context identifier is separate from the captured image and is usable to search for information related to the particular item; and
receive, in response to said transmission of said message, one or more annotations that include information about the particular item to be displayed in said camera view, wherein said one or more annotations are superimposed in a portion of said camera view including said captured image of said particular item.

\* \* \* \* \*